UNITED STATES PATENT OFFICE.

ANTON MESSERSCHMITT, OF STOLBERG, GERMANY.

MANUFACTURE OF AN ARTIFICIAL MANURE OR FERTILIZER.

1,214,346.   Specification of Letters Patent.   Patented Jan. 30, 1917.

No Drawing.   Application filed October 25, 1916.   Serial No. 127,686.

*To all whom it may concern:*

Be it known that I, ANTON MESSERSCHMITT, a subject of the German Emperor, and resident of Stolberg, 2, Rheinland, Germany, have invented certain new and useful Improvements in the Manufacture of an Artificial Manure or Fertilizer, of which the following is a specification.

My invention relates to the manufacture of an artificial manure or fertilizer, and has for its object to provide a process of manufacturing, from low valued and naturally found materials, a rich artificial manure containing all the nutritive substances requisite for the building up of vegetables, such substances as phosphoric acid, silicic acid, nitrogen, potassium, and lime.

In carrying the invention into effect, products are first produced from naturally found rocky minerals containing potassium, such rocks, for instance, as feldspar, leucite, phonolite, and natural phosphates, which products contain potassium and phosphoric acid in a decomposed condition. Useful processes for making products of this character are described in the German Patents Nos. 274409; 277705; and 283284. Such products may, for instance, be obtained by calcining or smelting suitably dressed mixtures of potassium containing minerals and phosphates, with limestone and alkali salts, for instance, soda; or mixtures of lime and alkali salts.

According to my present invention, nitrogen is incorporated to the thus obtained products containing the potassium and phosphoric acid in a decomposed form. This is preferably carried out by treating the said products with nitrogen oxid-containing substances such as nitrates or gases of nitric oxid which may be obtained synthetically or otherwise. The absorption of the gases is achieved by slightly moistening the gases with steam and allowing the moistened gases to act directly upon the calcination products which, too, may be slightly moistened for the same purpose.

Another method for attaining the same object consists in treating the mass in the heated condition with absolutely dry nitrous gases. This method may be conveniently carried out by feeding the disintegrated product of the decomposition within a revolving cylinder against a stream of nitric oxid gases, whereby, if properly conducted, a salable artificial manure can be directly obtained. However, the invention is not at all restricted to the described methods. It is obvious that any of the methods may be applied which have been proposed and adopted for the absorption of nitric oxids in the manufacture of nitrates or nitrites.

According to a modification of the process, instead of nitric oxids, completely formed nitrates, such as nitrate of lime may be used for producing a phosphorus-potassium-nitrogen complex-manure. Under certain circumstances, especially if working with nitrate of lime, considerable advantages are secured by using in place of the solid saltpeter, the highly concentrated hot solution which is absorbed by the porous product, whereupon the mixture congeals. Thus, the considerable difficulties hitherto experienced in transforming nitrate of lime into a dry salable stuff, are overcome in a very simple manner. The manure thus obtained and which can be after-dried in quite a convenient manner which offers no technical difficulties may now readily be ground in a suitable disintegrator. In comparison with the potassium-phosphoric-acid-manure obtained through the pyrogenous process, the manure manufactured according to my invention is superior in that it is devoid of the objectionable attribute of dusting, since owing to the action of the nitrates the finest particles have become luted and the product retains a certain degree of moisture. A further advantage accrues from the fact that the mixed manure obtained according to this invention although the same contains nitrates, is so little hygroscopic that the product may be shipped and stored in sacks, without the objectionable occurrence of clogging or baking. Hence, a serious disadvantage of the nitrate of lime is removed with one stroke. This effect is to be attributed to the fact that on the one hand the calcination product acts similar to infusorial silica, and on the other hand, a portion of the nitrate of lime, together with the potassium, is transformed into nitrate of potassium.

It is surprising that neither during the absorption of $N_2O_5$ and $N_2O_3$ by the calcination product, nor during the intermixing with $Ca(NO_3)_2$ does there occur a reduction of the decomposition of the $P_2O_5$, which is to be attributed to the fact that the citrate-soluble-$P_2O_5$-compound is especially firm.

The complex manure obtained according to this invention and which is non-dusting, and non-hygroscopic, and which does not clog nor decompose, means a considerable advance in the art to which it appertains since it offers extraordinary advantages both with regard to shipping the manure and to distributing the same upon the land.

Through his present idea the inventor was the first who succeeded in manufacturing from low valued natural materials a universal manure which contains all the nutritive substances requisite for the sustenance of vegetable life. For a manure of this character there is a special need, since the practical obtainment of like mixtures from Stassfurt salts, superphosphates, and nitrates proved unsatisfactory because of the very disturbing decomposing influences which are set up owing to the interaction of the magnesian salts, lime salts, free acid, and nitrates.

Examples.

(1) A product obtained by calcining leucite together with phosphate of lime and limestone according to the German Patent No. 274409, in a revolving kiln, and containing 5 per cent. $K_2O$ and 12 per cent. $P_2O_5$, absorbed 3 per cent. N upon treatment with moist nitrogen oxid gases, so that the final product contained 3 per cent. N+4 per cent. $K_2O$+10 per cent. $P_2O_5$.

(2) The same potassium-phosphate-product of the calcination treatment yields, on mixing the same with 10 to 25 per cent. of $NaNO_3$, or $KNO_3$, or $KNO_3+KaNO_3$, a complex manure of a variable proportion of $N:K_2O:P_2O_5$.

(3) A product similar to that resulting from the recipe (2) is obtained by adding an admixture of about 25 per cent. of calcium-nitrate in concentrated solution, and thereafter drying the product.

What I claim and desire to secure by Letters Patent of the United States, is:

1. A process of manufacturing a complex manure which comprises calcining or smelting potassium-containing minerals mixed phosphates and basic substances and treating the calcined material while in the heated condition with a nitrogen oxid-containing substance to effect a combination of nitrogen with said calcined material.

2. A process of manufacturing a complex manure which comprises treating with a nitrogen oxid-containing substance in the presence of hydrogen oxid, a product obtainable by calcining natural potassium-containing minerals mixed with phosphates and a basic substance until decomposition occurs.

3. A process of manufacturing a complex manure which comprises treating with a nitrogen oxid-containing substance in the presence of hydrogen oxid, a silicate combination containing potassium and phosphorus in available form.

4. A process of manufacturing a complex manure which comprises treating with a concentrated solution of a nitrate, a silicate combination containing potassium and phosphorus in available form.

5. A process of manufacturing a complex manure which comprises treating a product obtainable by pyrogenically decomposing a mixture of potassium-containing minerals, phosphates and a basic substance, with a hot concentrated solution of calcium nitrate.

6. A process of manufacturing a complex manure which comprises absorbing a hot concentrated solution of a nitrate in a pyrogenically decomposed mineral combination containing potassium and phosphorus in available form, and drying the mixture to produce a non-dusting substantially non-hygroscopic manure.

7. A process of manufacturing a complex manure which comprises calcining or smelting such natural minerals as contain potassium, with phosphates and limestone, treating the thus heated product with about 25% of calcium nitrate in hot concentrated solution and drying the resulting mixture to produce a non-dusting substantially non-hygroscopic manure.

In testimony whereof I have signed my name to this specification in the presence of two subscribing witnesses.

ANTON MESSERSCHMITT.

Witnesses:
 CHARLES A. JOHNSON,
 EMIL VAN WANUELE.